3,041,186
PROCESS FOR STERILIZING OR PASTEURIZING FOOD PRODUCTS
Friedrich Hastrich, Mannheim, Germany, assignor to Nadler-Werke Dr. Paul Nadler, Mannheim, Germany
No Drawing. Filed May 9, 1960, Ser. No. 44,485
Claims priority, application Germany May 13, 1959
4 Claims. (Cl. 99—211)

The present invention relates to a process for pasteurizing or sterilizing emulsions of food products which consist at least partly of fatty ingredients, e.g. milk, cream, butter, margarine, mayonnaise, mayonnaise mixes, soft cheeses, and the like.

Some of these products have been pasteurized up to now by heat treatment, others cannot undergo such a treatment. In any case, the results are far from satisfactory. For instance, when butter or margarine is heated, the fatty emulsion is decomposed and a molten fat is obtained which is different in taste from the original products and cannot be used in the same manner. As far as milk is concerned, pasteurization is a conventional processing step, but even pasteurized milk will not keep indefinitely and the flavor of such milk is considerably affected by the heating, taking on a "boiled taste" which will by no means equal the flavor of fresh unprocessed milk.

Mayonnaises, which are preparations of egg yolk and oil, with addition of salt and spiced vinegar, and which have a fat content of at least 20% in the cheaper brands and more than 83% in the more expensive ones, keep only a limited time and have to be stabilized by addition of preservatives when they are used for dishes in combination with meat, fish, or vegetables; such combination dishes have to be classed as semipreserves.

Many attempts have already been made, especially as regards mayonnaise and mayonnaise mixes, to stabilize them without the addition of preservatives, in order to obtain true preserves; however, these attempts have been unsuccessful. Mayonnaises and dishes made in combination with mayonnaise separate into the components or coagulate when exposed to boiling temperature, to sunlight, to frost, or on shaking.

The heating devices used for pasteurization or sterilization are of different types; most of them use the principle of heat exchange through a metal wall. Both the principle of heat exchange through metal parts, as well as the arrrangement of the exchange elements leave much to be desired.

One of the inconveniences lies in the fact that the liquid particles in contact with the heating surfaces are heated up to higher temperatures than the temperature desired in the interior of the vessel. As a consequence, the emulsion will become scorched and deposits will form at the heating surfaces. The quality of emulsions is also very definitely impaired by heat treatment. The proteins deposit, and in milk the creaming property is destroyed. The difficulties which are incurred when the emulsion contacts the heating surfaces of a sterilizer are a consequence of the fact that all emulsions are poor conductors of heat.

It is an object of the present invention to provide a sterilizing process and means for carrying it out, which will permit to stabilize perishable food products without loss of fresh taste and other desirable properties.

It is another object of the present invention to provide a sterilizing process by which emulsions will not disintegrate and foods combined therewith will keep for a long time.

It is another object of the process according to the invention to impart to food products a lasting stability without the addition of conventional preservatives.

Other objects and advantages will become apparent from the following detailed description.

It has now been found that food products which consist at least in part of fatty emulsions such as milk, cream, butter, margarine, mayonnaise and so on, can be sterilized effectively and without harmful effect for the flavor and other properties of the products, by proceeding according to the invention in the following manner. In carrying out the heat treatment, care has to be taken that between the product to be sterilized or pasteurized and the heat transferring medium, e.g., the wall of a vessel, a protective zone of moisture will always be present. This can be brought about in different ways.

One preferred embodiment of carrying out the process according to the invention consists in filling the food product into a vessel, whose inner walls are covered completely by a lining which is moistened by water or steam, whereupon the vessel is closed hermetically and heated to sterilizing or pasteurizing temperatures, e.g. temperatures from 70 to 120° C.

This leads to the unexpected result that emulsions, which are contacted by steam are capable of taking up the heat rapidly without undergoing any disintegration. The times neecssary for sterilization are shortened and correspond as a rule to those goods which consist of a liquid and a solid phase. The water absorbing layer may be obtained by using a moistened support, e.g. parchment paper, filter paper, linen or other fabric. Another method of carrying out the process is to fill a bag, which has been moistened, by the goods to be sterilized and place it into a vessel which is then sealed and heated, as described before.

According to yet another mode of procedure, a gelatinous layer, e.g. of gelatine, alginate, or pectin, is applied to the inner walls of a vessel, after the latter has been meticulously cleaned and freed of traces of fat and alkali, so that adhesion of water will be as effective as possible. However, the other method is preferable, which uses a wrapping of moistened water absorbent material which is of the desired curved shape, to envelop the enclosed goods closely.

As vessels or containers I may use cans, glasses, tubes, bags, cardboard containers, plastic wrappings, sausage tubes, and the like, which have at the inside applied thereto a lining containing some moisture absorbed. These containers are filled with the goods in a manner known in the sterilizing art and are heated as usual. It is an added advantage that the sterilizing time is considerably shortened when compared with the usual time necessary for such operations.

I have found that very good results may be obtained by heating to temperatures below 100° C.; care should be taken to choose the right type of shape of the container. If a can is used, it should be either of comparatively large height and small diameter, or it should be wide and flat. In any case, it is necessary to make sure that the core of the emulsion is heated up to sterilizing temperature within the time set for the heating process.

It is the purpose of the lining placed on the inner wall of the cans to provide a buffering of moisture between the heated wall and the goods. A mayonnaise heat-treated in accordance with the invention or a combination dish made of mayonnaise with meat, fish, or vegetables, is to be considered as a true preserve, which needs no preservative for stabilization. Fatty emulsions may also be mixed after sterilization with meat, fish, eggs, vegetables, sea food, or mushrooms, and will neither deteriorate nor coagulate.

In the following, the invention will be described in a number of examples, but it should be understood that these are given by way of illustration and not of limitation and that many changes in the details, e.g. the goods treated, the temperatures used, the time during which heating is carried out, and other details, may be made without departing from the spirit of the invention.

*Example 1.—Sterilization of Mayonnaise*

A mayonnaise is made by mixing egg yolks, vegetable oils, salts, spices and spiced vinegar in the proportions established in the preparation of this article of food.

A can is then prepared by placing at the bottom a disc of parchment paper, which has been passed through distilled water and allowed to drip off for a short time. In a similar manner, the side wall of the can is lined with parchment paper moistened with distilled water. The can is then filled to the brim with mayonnaise or a mixture of mayonnaise with meat, fish, egg or any other desired food. The top of the goods filled into the can is again covered with a piece of moistened parchment paper, whereafter the can is hermetically closed in the conventional manner.

Instead of parchment paper, some other water absorbent lining may be used for the can, e.g. filter paper, an absorbent fabric such as linen, or the like, which has been moistened as described and allowed to drip for a short time.

After the can has been filled and closed, the contents are sterilized for about 13 minutes in rapidly boiling water. The time for sterilization depends, of course, on the size and shape of the container. If desired, sterilization may also be effected in an autoclave at temperatures above 100° C. While the boiling is going on, the lid of the can may slightly bulge above the contents, but after cooling it will resume its former shape.

Mayonnaise sterilized as described will keep indefinitely. As compared therewith, mayonnaise sterilized in a glass or can, which has not been lined in the manner described with absorbent material dipped in water, for instance when lined with dry paper, will be of limited stability.

It is not absolutely necessary to use distilled water for moistening the lining, ordinary tap water, or diluted acetic acid, may likewise be used. However, it is important that the lining be moistened, since without a moistened lining protecting it from the contact with the heated walls, mayonnaise will always coagulate.

*Example 2.—Sterilization of Butter*

Into a can of tin sheet having a height of 7.5 cm. and a diameter of 5.5 cm., a lining is placed on all walls consisting of moistened parchment paper. Into the can, 180 grams butter are placed which completely fill the can. The surface of the butter is then likewise covered with moistened parchment paper. Thereupon, the can is hermetically closed and heated on a waterbath or in an autoclave at a temperature ranging from 80 to 120° C., preferably at a temperature below 100° C., for about 20 minutes. After heating, the can is cooled with water, while being moved. Tests have shown that in the comparatively short time of 14 minutes, on a waterbath of 80° C., the core of the goods will have reached the same temperature as the outer mass.

Whereas butter, when heated in an open vessel or even a closed vessel, at 40–50° C., will separate into a fatty layer on top and an aqueous layer below, the contents of the can treated in accordance with the invention, does not show any change in the emulsion characteristics of the butter. When stored in the sealed can after sterilization, the butter was safe from becoming rancid over a period of several weeks, and even when the can was opened, but placed in a refrigerator, it was not rancid after 14 days.

Similar results were obtained with milk, cream, cream cheese, margarine, and all the other products mentioned before and others having a substantial amount of perishable ingredients. The proteins will not coagulate or disintegrate, no particles will become scorched, and the flavor will remain fresh and delicious and entirely free of the known "canned" taste of many products sterilized according to known methods.

In the following claims the expression "food products consisting at least partly of fatty emulsions" includes milk, cream, cream cheese, soft cheeses, margarine, mayonnaise, mayonnaise mixes, and the like.

By "food ingredients forming with the fatty emulsion a combination dish" I understand meat, fish, vegetables, sea food, eggs, mushrooms and similar known ingredients.

What is claimed is:

1. A process for sterilizing food products consisting at least partly of fatty emulsions which comprises passing a bag of water-absorbent material through water and allowing it to drip, enclosing food products in said bag, placing said bag in a container, which is then hermetically sealed and heated to a temperature of 70°–120° C.

2. A process for sterilizing food products consisting at last partly of fatty emulsions which comprises placing a steam-permeable lining on the bottom and walls of a container, moistening said lining with water, filling goods to be sterilized into said container, covering the goods with a sheet of said moistened lining material, sealing the container, and heating it to temperatures between 70°–120° C.

3. The process according to claim 2, wherein the steam-permeable lining consists of a water absorbent paper.

4. The process according to claim 2, wherein the steam-permeable lining consists of a water-absorbent textile fabric.

References Cited in the file of this patent
UNITED STATES PATENTS
1,740,176    Hormel _____ Dec. 17, 1929